(No Model.)

J. HARRIS.
NUT LOCK.

No. 601,889. Patented Apr. 5, 1898.

Witnesses:
Fenton S. Belt,
Sylvester Cassell

Inventor:
John Harris,
by H. B. Willson & Co.,
Attorneys.

UNITED STATES PATENT OFFICE.

JOHN HARRIS, OF SHAMOKIN, PENNSYLVANIA.

NUT-LOCK.

SPECIFICATION forming part of Letters Patent No. 601,889, dated April 5, 1898.

Application filed December 22, 1897. Serial No. 662,993. (No model.)

*To all whom it may concern:*

Be it known that I, JOHN HARRIS, a citizen of the United States, residing at Shamokin, in the county of Northumberland and State of Pennsylvania, have invented certain new and useful Improvements in Nut-Locks; and I do declare the following to be a full, clear, and exact description of the invention, such as will enable others skilled in the art to which it appertains to make and use the same.

My invention has relation to a nut-lock; and the object is to simplify the construction and provide a device of this character which renders it absolutely impossible for the nut to accidentally work loose, although permitting of the removal of the nut by manual means without in the least damaging the nut or bolt.

With this object in view the invention consists in certain features of construction and combination of parts, which will be hereinafter fully described and claimed.

Figure 1:
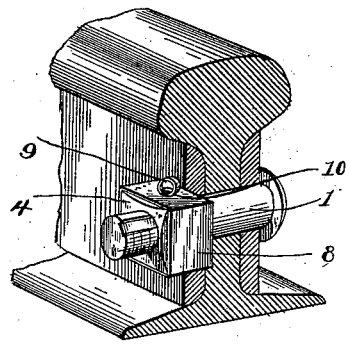
Figure 2:
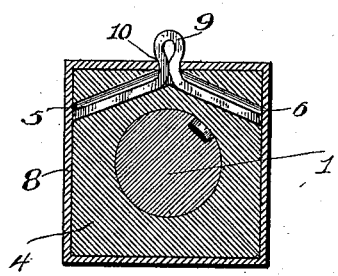
Figure 3:
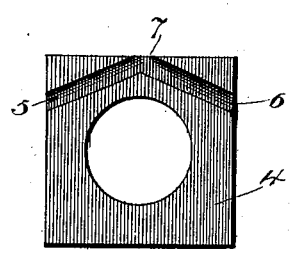
Figure 4:
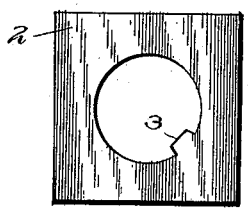

In the accompanying drawings, Figure 1 is a perspective view of my improved nut-lock. Fig. 2 is a transverse sectional view through the encompassing band, the outer nut, split key, and bolt. Fig. 3 is a view of the outer nut, looking at its base; and Fig. 4 is a similar view of the inner nut.

In said drawings, 1 denotes the bolt, the threaded end of which is longitudinally grooved. 2 denotes a nut having a rib 3 to engage said groove. The aperture of this nut is unthreaded.

4 denotes the outer or clamping nut. The base of this nut is provided with two oblique recesses 5 and 6, intersected by a vertical aperture 7, extending through the side of the recess.

8 denotes an encompassing band, and 9 the split key.

The parts are assembled in the following manner: The bolt is passed through the object or objects desired to be clamped and the nut 2 slipped upon the end of the bolt, with its rib in the groove of the bolt. The clamping-nut is then placed upon the end of the bolt and is screwed home until its base contacts with the nut 2. The band is now placed around both nuts, and as the nut 2 has no rotary movement it will be impossible for the nut 4 to work loose. In other words, the nut 2 is prevented from moving longitudinally upon the bolt by the nut 4, and when the band is placed around both nuts the nut 4 is prevented from rotating or unscrewing from the bolt by the nut 2.

In order to hold the band in position, I provide the split key 9, which is inserted through an aperture 10 in the band, then through the aperture 7 and driven home. In driving the key its ends will be spread apart by the inclined or diagonal recesses in the base of the nut, thus preventing it from accidentally working loose.

Although I have specifically described the construction and relative arrangement of the several elements of my invention, I do not desire to be confined to the same, as such changes or modifications may be made as clearly fall within the scope of my invention without departing from the spirit thereof.

Having thus described my invention, what I claim, and desire to secure by Letters Patent, is—

The combination with a grooved bolt, a nut having a rib adapted to said bolt, a clamping-nut having at its base diagonal communicating recesses intersected by an aperture, a band for encompassing both nuts provided with an aperture, and a split key adapted to be inserted through the aperture of the band and nut and to have its ends spread apart by the diagonal recesses, substantially as set forth.

In testimony whereof I hereunto affix my signature in presence of two witnesses.

JOHN HARRIS.

Witnesses:
 PETER W. MILLER,
 PAUL FENDRICK.